United States Patent [19]

Church

[11] Patent Number: 5,608,622
[45] Date of Patent: Mar. 4, 1997

[54] SYSTEM FOR ANALYZING TRANSLATIONS

[75] Inventor: Kenneth W. Church, Chatham, N.J.

[73] Assignee: Lucent Technologies Inc., Murray Hill, N.J.

[21] Appl. No.: 944,148

[22] Filed: Sep. 11, 1992

[51] Int. Cl.$^6$ ..................................................... G06F 17/28
[52] U.S. Cl. ........................... 395/753; 395/759; 395/794
[58] Field of Search ......................... 364/419.05, 419.07, 364/419.04, 419.02, 419.08, 419.11, 419.13, 419.19, 419.03

[56] References Cited

U.S. PATENT DOCUMENTS

| | | | |
|---|---|---|---|
| 4,599,612 | 7/1986 | Kaji et al. | 364/419 |
| 4,641,264 | 2/1987 | Nitta et al. | |
| 4,685,060 | 8/1987 | Yamano et al. | 364/419 |
| 4,814,988 | 3/1989 | Shiotani et al. | 364/419 |
| 5,020,021 | 5/1991 | Kaji et al. | 364/419 |
| 5,075,850 | 12/1991 | Asahioka et al. | 364/419 |
| 5,222,160 | 6/1993 | Sakai et al. | 364/419.02 |
| 5,323,310 | 6/1994 | Robinson | 364/419.02 |
| 5,349,368 | 9/1994 | Takeda et al. | 364/419.03 |
| 5,351,189 | 9/1994 | Doi et al. | 364/419.02 |

OTHER PUBLICATIONS

Translator's Workbench Overview, MCB Systems, San Diego, CA, 1991.

"Using Cognates to Align Sentences in Bilingual Corpora", M. Simard, G. F. Foster, P. Isabelle, *Fourth International Conference on Theoretical and Methodological Issues in Machine Translation*, Montreal, Canada, CCRIT–CWARC, Jun. 25–27, 1992.

"A Program For Aligning Sentences in Bilingual Corpora", W. A. Gale, K. W. Church, *Association for Computational Linguistics*, 1991.

"Concordances for Parallel Text", K. W. Church and W. A. Gale, *Seventh Annual Conference of the UW Centre for the New OED and Text Research*, Oxford, England, 1991.

Primary Examiner—Robert A. Weinhardt

[57] ABSTRACT

Apparatus and methods for comparing a text with its translation. The apparatus uses cognates in the text and the translation to make a list of first positions in the text and second positions in the translation. The second position specifies a location in the translation which is in the neighborhood of the translation of the first position in the text. By means of the list, a given location in the text can be related to a location in the translation which is in the neighborhood of the translation of the given location. The list permits parallel displays of the text and the translation and easy production of full-context concordances, glossaries, and histograms. Graphs based on the list can be used to detect parts of the text which are not in the translation and vice-versa. The list is made using a technique which iteratively computes an alignment path in a graph which records the positions of matching 4-grams in the text and the translation. The technique is more robust than techniques which use sentences and paragraphs to determine alignment.

22 Claims, 8 Drawing Sheets

FIG. 2
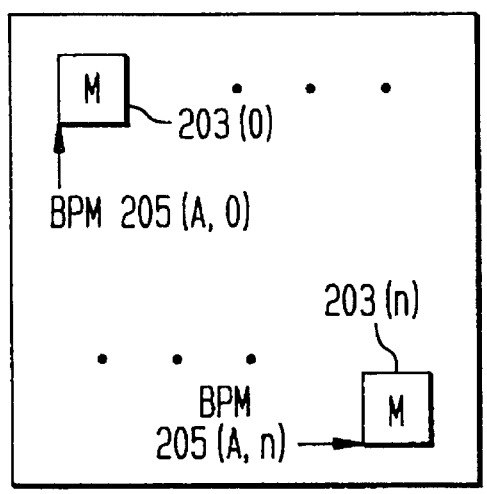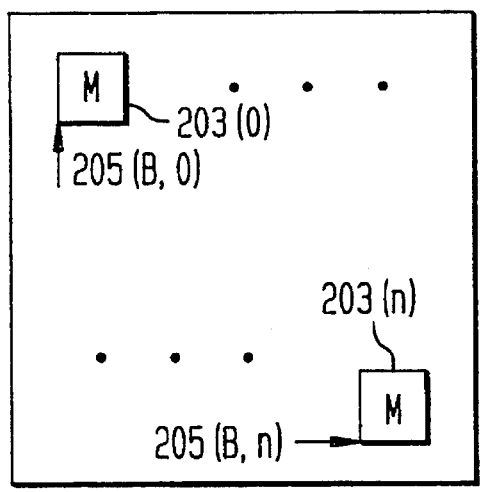

FIG. 8 gefiel. Im Klassenunterricht in der (Christlichen Wissenschaft) zitierte un- ser
n he approved of. During class instruction in (Christian Science) our teacher quo
                                                              └─805 er der Entdek- kerin und Gründerin der Christlichen Wissenschaft", die schreibt:
Eddy, the Dis- coverer and Founder of Christian Science: "I recommend that Scien en, sodern daß sie die Wahr- heit der Christlichen Wissenschaft denken, sprechen
an- other but think, speak, teach and write the truth of Christian Science with it in unser Leben eingelassen. Und die Christlichen Wissenschafter könnten mehr t
and division into our experience. And students of Christian Science could do mor auer ansehen, die Mrs. Eddy für einin Christlichen Wissenschafter" gibt, werden
zen or so definitions Mrs. Eddy gives of a "Christian Scientist," we will be much s und ganz natürlich auf das Thema der Christlichen Wissenschaft über. Nach einer
tlessly and quite natu- rally to the topic of Christian Science. After a short wh 803 points to "Christlichen Wissenschaft"

801

SYSTEM FOR ANALYZING TRANSLATIONS

BACKGROUND OF THE INVENTION

1. Field of the Invention

The invention relates generally to machine manipulation of natural languages and more specifically to the use of such machine manipulation to aid translators.

2. Description of the Prior Art

In the early days of computers, many experts assumed that the computer would soon completely automate translation from one natural language into another. Such machine translation was the subject of much research, but the problem was far more difficult than originally believed, and translation from one natural language into another has remained the province of human translators. At present, translators generally either work completely independently or under contract to a translation service bureau, which provides an interface between those seeking translations and the translators.

With the advent of the low-cost personal computer (PC), attention turned to the development of translator's tools for the PC. These tools do not aim to completely automate translational work but instead to make the human translator's work easier and therefore faster and more accurate. A state-of-the-art set of such translator's tools is the Translator's Workbench, sold in the United States by MCB Systems, San Diego, Calif. As described in a 1991 brochure published by MCB Systems, the Translator's Workbench includes the following features:

- A concept-oriented terminology data base which may be used in a network environment;
- A text analysis program which determines which words in the text to be translated are in the terminology data base and makes a project dictionary of those words;
- A translation editor which highlights words in the text which are in the project dictionary. When the cursor is moved to a highlighted word, the translation from the terminology data base is displayed at the bottom of the screen. The translation at the bottom of the screen can then be "pasted" into the translation.
- A split text display in the translation editor which shows the translator both a portion of the original and a Corresponding portion of his translation. The two sides of the display are coordinated by means of a user-specified paragraph character which is common to the original and the translation.

While translator's tools like the Translator's Workbench are indeed useful, they nevertheless do not help a translator with two classes of tasks: that of finding the right term from among a set of possible terms and that of comparing a text with any other text which is purportedly a translation of that text.

The task of finding the right term is fundamental to translation. Dictionaries or electronic equivalents of dictionaries such as the terminology data base of the Translator's Workbench only represent a starting point. To begin with, dictionaries are often out of date. Further, they often do not contain highly-specialized vocabulary. Finally, even where they do have an entry for a term, they generally offer a number of alternative translations without much guidance to how to use them. Even after a translator has avoided all of these problems, the problem of consistency arises. For example, a translation may be one of a series for a given client; within the series, the use of terms should be consistent.

Thus, in many cases, the only way to find the right term has been by hand: either the translator or a specialist in the translation service bureau compares texts and their translations which belong to the domain to which the text he is translating belongs. The text's domain may be defined by a particular subject matter or even by a particular client. Sometimes the texts to be compared are available electronically and the translator or specialist can use text searching tools on them; more often, the texts are not available electronically, and the only way to do the work is by comparing paper copies. Having made the comparisons, the translator or specialist makes a glossary which is specific to the domain. If the translator or specialist has tools such as the Translator's Workbench available to him, the translator will put the glossary into the terminology data base or an equivalent thereto; otherwise, he may simply put it into a text file or even on to paper. Clearly, the quality of a translation depends to a great degree on the quality of the glossaries available to the translator. That is particularly the case when a translation is undertaken by more than one translator. In such a situation, the glossaries are the best way of maintaining consistency among the translators.

Among the situations where it is necessary to compare a text with its translation are checking a finished translation for completeness and finding out how the revision of a text which has already been translated relates to the pre-existing translation. In both cases, the only practical way to carry out the comparison is to examine the original and the translation page for page. Of course, such comparisons are often done in haste, and often fail to detect missing material or material which should be changed in the translation of the revision.

What is needed, and what is provided by the techniques described in the following, is apparatus and methods which reduce the effort involved in comparing a text with its translation and consequently make it easier to produce domain-specific glossaries and to detect differences between a text and its translation.

SUMMARY OF THE INVENTION

The apparatus for solving the foregoing problem includes apparatus for comparing a first text and a second text which is at least in part a translation of at least a portion of the first text. The apparatus includes

- a set of pairs of locations, each pair of locations including a first location in the first text and a second location in the second text which is in the neighborhood of the translation of the first location and the pairs of locations being selected without regard to locations Of sentences and/or paragraphs in the first text or the second text; and
- means for responding to a specification of a given location in the first text by employing the set of pairs of locations to determine a specification of a corresponding location in the second text which is in the neighborhood of the translation of the first location.

In a preferred embodiment, the Set of pairs of locations is produced from an alignment path for the first text and the second text. The alignment path is made using the following method:

- making an F-image which has a plurality of cells, each cell representing a first portion of the first text and a second portion of the second text and each cell being given a first value if the first portion and the second portion do not contain the same n-gram and a second value if they do; and computing the alignment path from the F-image.

The above method may also be used with files generally to locate similarities in the files.

The techniques disclosed and claimed in this application may be used to display a text and its translation in parallel, to make full-text concordances, to make glossaries, to make histograms, and to detect pans of a text which are not present in the translation and vice-versa. The foregoing and other objects and advantages of the invention will be apparent to one of ordinary skill in the an who peruses the following Drawing and Detailed Description, wherein:

BRIEF DESCRIPTION OF THE DRAWING

FIG. 2 is an overview of the process of aligning files in a preferred embodiment;

FIG. 8 is a concordance made using a FIT file.

Figure 1:
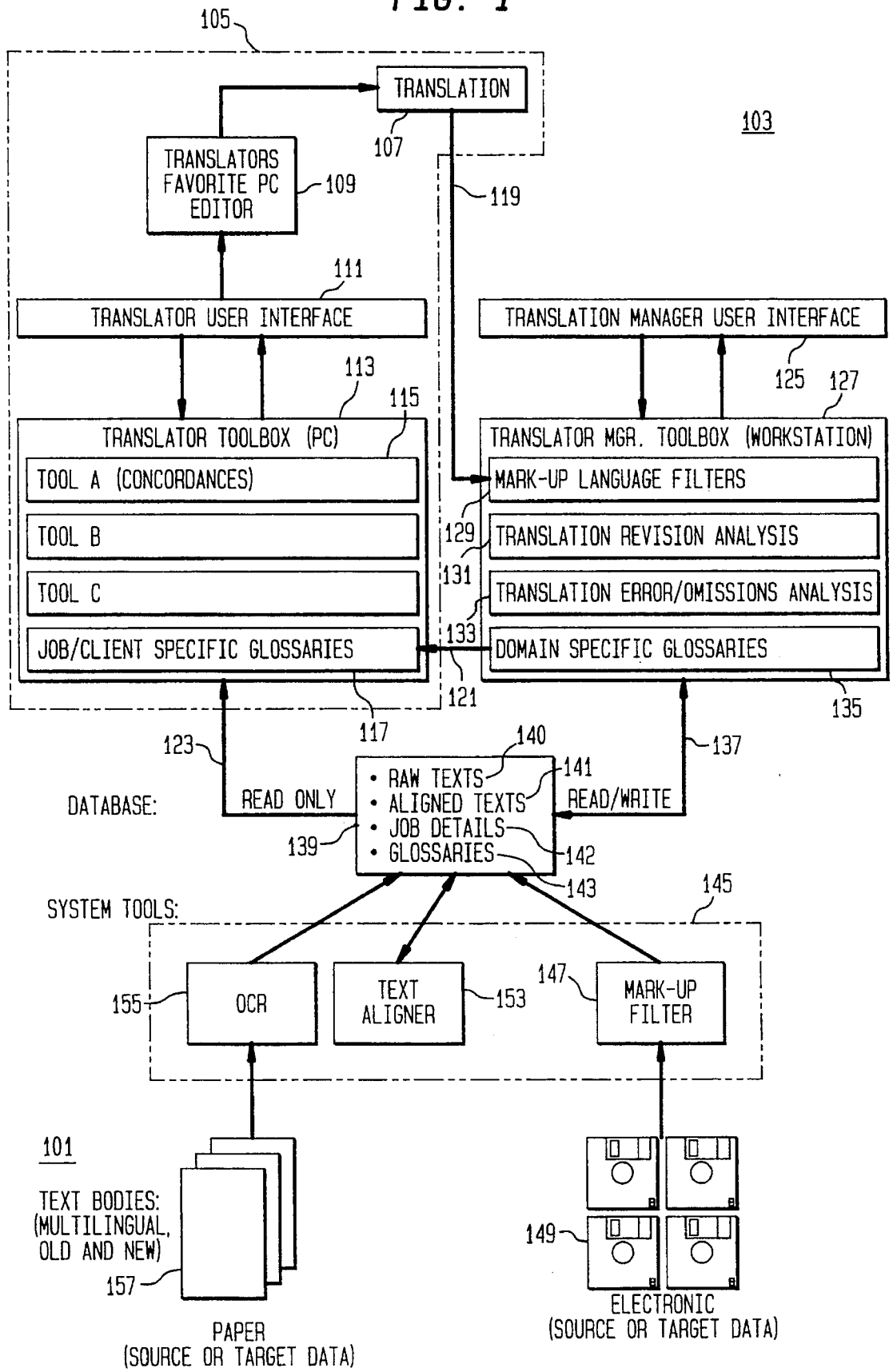
FIG. 1 is an overview of a translator's assistant which employs the techniques disclosed herein.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description of a preferred embodiment of the translator's assistant will first provide an overview of the architecture and operation of the translator's assistant and will then describe in detail how the translator's assistant's aligned text data base is made and used.

Architecture of the Translator's Assistant: FIG. 1

FIG. 1 is an architectural overview of a presently-preferred embodiment of translator's assistant 101. The presently-preferred embodiment is intended to be used by a translation service bureau and its translators. In some cases, the translators may be employees of the translation service bureau; in others, they may be independent contractors. Translator's assistant 101 has two main components: translation manager part 103 and translator part 105. Translation manager part 103 is used by employees of the service bureau whose job it is to manage the production of translations by the bureau's translators. Translator part 105 is used by the bureau's translators as they translate. In the presently-preferred embodiment, translation manager part 103 is implemented on a SUN workstation and translator part 105 is implemented on a personal computer. As will be apparent from the following discussion detail later, the reason why translation manager part 103 is implemented on a SUN workstation is that certain operations of translation manager part 103 require more memory than is presently available in many personal computers. As personal computers grow more powerful, it may become possible to implement both translation manager part 103 and translator part 105 on a personal computer.

Translation Manager Part 103

The components of translation manager part 103 include translation manager user interface 125, which controls a graphical user interface (GUI) including a display device, a keyboard, and a pointing device such as a mouse. The user of the translation manager part employs translation manager user interface 125 to select and control a set of programs making up translation manager toolbox 127. In the presently-preferred embodiment, the programs include the following:

- mark-up language filters 129, which process files produced by translators using standard text editing programs to facilitate further processing in translation manager part 103;
- translation revision analysis 131, which is used to detect what portions of a revised text require translation;
- translation error/omissions analysis, which is used to detect errors and/or omissions in a finished translation; and
- glossary maker 135, which is used to make domain-specific glossaries.

As shown by arrow 137, all of the above programs read from or write to database 139. Data base 139 includes the following kinds of information:

- raw texts 140, that is, texts either in the form in which they are received in translation manager part 103 or after they have been processed by a mark-up language filter 129 or 147;
- aligned texts 141: pairs of raw texts which are translations of each other and which have been aligned, i.e., information has been associated with the pair of files such that if a first location in one text of a pair is provided, a second location may be automatically found in the other text of the pair which contains a translation of the first location.
- job details 142: information about the translation jobs being done by the translation bureau. Job details in a preferred embodiment include an identification for the client, the topic of the translation, the language, the number of words to be translated, the date received and the date to be finished, and any special requirements.
- glossaries 143: domain-specific glossaries produced using tool 135.

Also writing to and reading from data base 139 are system tools 145. In a presently-preferred embodiment, these tools include:

- mark-up filter 147, which takes text input via floppy disks 149 or a network connection and converts it to a form better suited for the alignment operation;
- text aligner 153, which produces aligned texts 141.
- optical character reader 155, which reads paper copies of texts and produces raw texts 140 from them.

In overview, the operations in translation manager part 103 which are of interest in the present context include preparing raw texts 140 from texts received from translators, clients, and other sources, aligning pairs of raw texts 140 which are translations of each other, and using the aligned texts 141 in the operations of displaying parallel locations in the pair of texts, making glossaries and concordances, checking a translation for completeness and correctness, and determining how much of a revision must be retranslated.

Translation manager part 103 is employed in the translation process as follows: When the translation service bureau receives a job from a client, it enters information about the job in job details 142 and then analyzes the document to be translated and gives the customer a price.

If the client decides to go ahead with the translation, the document to be translated is input to data base 139. The document may have been received in the form of paper copy or perhaps as an electronic document file. If the job is paper copy, it will be read by OCR 155 to produce a raw text 140; if it is an electronic document file, it may be processed by mark-up filter 147 to produce a raw text 140. The other thing that needs to be done before translation can begin is using translation manager part 103 to prepare a job/client specific glossary 117 for the job. If translations have already been done for the same client in the same domain, aligned text pairs 141 selected from those translations are used to make concordances and the concordances are used to make the glossary. The use of texts from the same client ensures that the use of terminology in the new translation will be consistent with the use of terminology in the old translation. If there are no such translations, there may already be a glossary for the domain available; if not, aligned text pairs of other translations in the same domain will be used to make the glossary. All glossaries produced using the translation manager part are of course archived for possible future use. As can be seen from this description, the existence of a data base of aligned texts makes it possible for the translation bureau to take full advantage of its previous experience in translating in a given domain when making a new translation.

If the job is a revision of a document for which the translation bureau did a translation of an earlier version, the revision can be aligned with the translation of the earlier version. As will be explained in more detail below, the alignment makes it possible to see how sections have been added to or deleted from the revision, and consequently what changes need to be made in the translation of the earlier version.

Having made or located the relevant glossaries, the service bureau now sends the translator the raw file of the document to be translated together with the glossary and in the case of a revision, the old translation and a list of parts to be translated. If the translator is connected via a network to the service bureau, the network will be used to send the materials; otherwise, they will be sent on diskettes or in a few cases even on paper. In some cases, the service bureau may also send the translator copies of aligned texts from the relevant domain so that the translator can do his or her own terminological research. The translator then uses translator part 105 to make the translation and sends translation 107 back to the service bureau. Again, the translation may be sent electronically, on a diskette, or even as a paper copy. The service bureau thereupon adds the translation to the collection of raw texts, aligns the translation with the original and uses the resulting aligned texts to check for consistent use of terminology and omissions of text. If no further work is necessary, the translation is sent to the customer; otherwise, it is edited by the translation bureau or returned to the translator for further work.

Translator part 105 is used by translators while producing a translation 107. In a presently-preferred embodiment, translator part 105 is implemented in a PC. Communication between translator part 105 and translation manager part 103 may be by means of connections such as those provided by modems and telephone lines or networks or may be simply by means of media such as diskettes which are sent physically between the service bureau and the translator. The translator uses his favorite PC editor 109 to produce the translation. While working on the translation, he uses translator user interface 111 to control tools in translator toolbox 113. In some cases, translator user interface 111 may be available through PC editor 109; in others, it may be in a separate window in the PC display. Translator toolbox 113 may include tools like those of the Translator's Workbench described above; additionally, it contains a tool 115 for making concordances from aligned texts 141 and a tool 117 which permits the translator to access domain-specific glossaries 135. Translator part 105 could of course be implemented in a larger machine. Implementation in a PC is possible because translator part 105 in a preferred embodiment does not include text aligner 153 and does not have that component's memory requirements.

In overview, operation of translator part 105 is as follows: When the translator is to do a translation, the translation manager sends him a raw text 140 containing the text to be translated, a domain-specific glossary 143 for the domain to which the text to be translated belongs, and perhaps also a pair of aligned texts 141 belonging to the domain. The translator translates raw text 140 using domain-specific glossary 143; if the translator needs a term which is not in domain-specific glossary 143 or if he desires further information about the use of a term in the domain, he uses concordance tool 115 to make a full-context concordance from the pair of aligned texts. The concordance shows all occurrences of the term of interest in their contexts in one of the pair and shows the corresponding locations and their contexts in the other of the pair. When translation 107 is finished, the translator sends it to translation manager part 103 to be checked.

Details of Aligned Texts 141: FIGS. 2–5, 8

Aligned texts 141 are pairs of raw texts 140 which are translations of each other and which have associated with them information which relates a first location in one of the pair of texts to a second location in the other of the pair which contains the translation of whatever is at the first location, and thus permits automatic determination of the second location from the first location. As is apparent from the foregoing discussion of translator's assistant 101, a key operation performed by translation manager 103 is the automatic alignment of pairs of raw texts.

The principle which permits automatic alignment of such pairs is the following: A text and its translation include items which are not much affected by the translation operation. For example, a paragraph in a text generally corresponds to a paragraph of the translation, and the same is true of sentences. Further, some words will not be greatly affected by the translation. Among such words are cognates (words that are the same in the languages of the pair of texts), proper nouns, and terms which are common to everyone who practices a given science or technology. Examples of the latter are mathematical expressions, scientific names, and the keywords of a given programming language.

These items which are not much affected by the translation operation may be used as markers which indicate corresponding positions in the pair of raw texts 140, and the location of a translation of a given location may be found by determining the given location relative to the markers in the first one of the pair and finding a location which has a similar relation to the markers in the second one of the pair. That location should be reasonably close to the translation of the given location, and consequently, the area surrounding the location in the second one of the pair should contain the translation. The area surrounding the given location in the first one of the pair of raw texts can be displayed together with the area surrounding the location in the second one of the pair, so that the user of the system can determine the translation for himself, or various operations can be performed on the two areas to determine the most probable translation.

Figure 3:
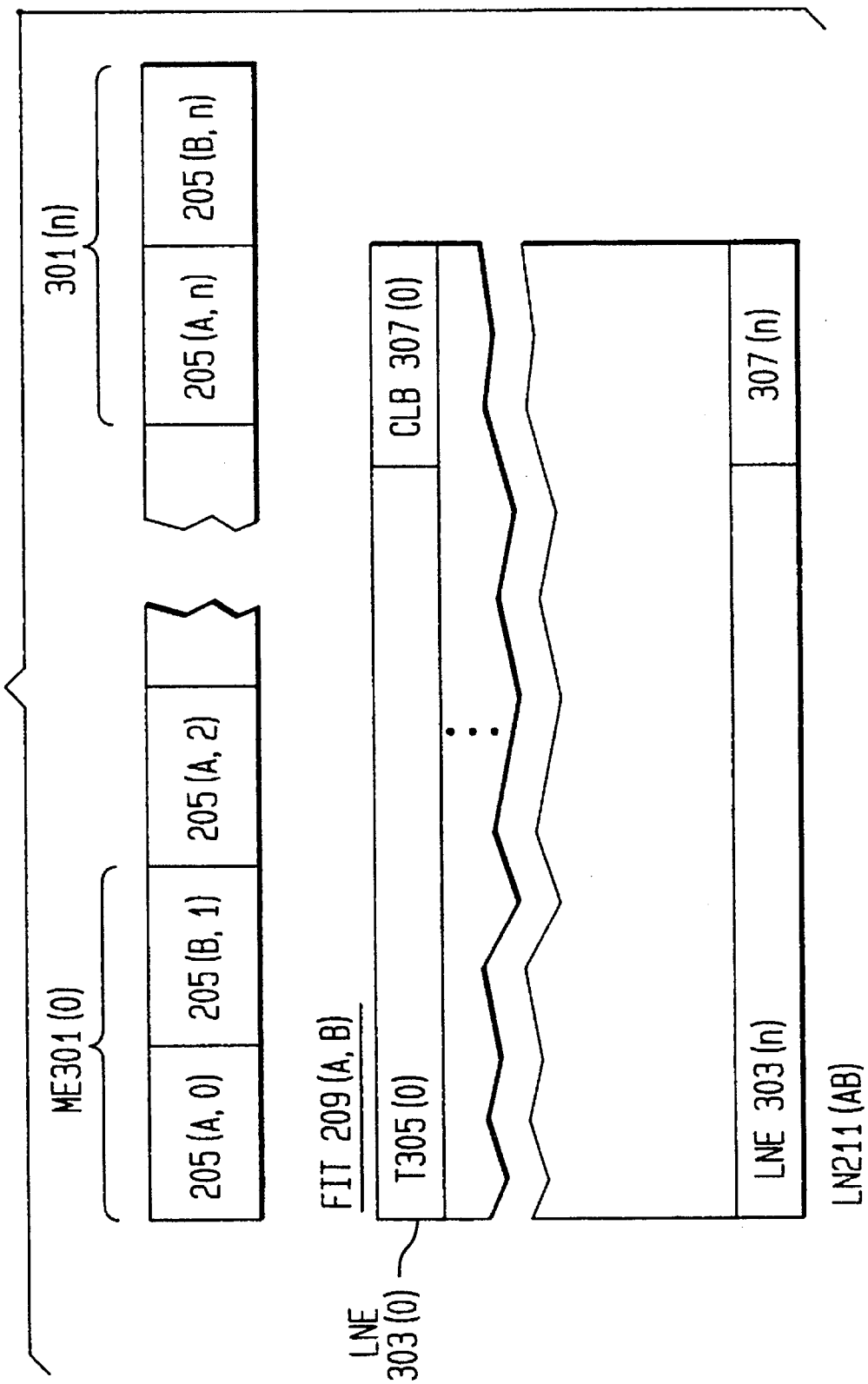
FIG. 3 is a diagram of the FIT and LN files employed in a preferred embodiment.

FIGS. 2 and 3 show how aligned texts are represented in a preferred embodiment. Beginning with FIG. 2, FIG. 2 shows file pair 201, made up of raw text file 140(A) and raw text file 140(B), which are translations of each other. File 140(A) includes a set of markers 203(0 . . . n), and file 140(B) includes a set of corresponding markers 203(0 . . . n). Each marker 203 has a byte position (BPM) 205 in each file; thus, the byte position of marker 203(O) in file 140(A) is BPM 205(A,0), and the byte position of that marker in file 140(B) is BPM 205(B,0).

The manner in which files 140(A) and (B) making up the file pair are aligned is shown at 207. Files 140(A) and (B) are provided to aligner 153, which in a preferred embodiment produces four files for the file pair:

Two FIT files 209. FIT file 209(AB) relates the byte positions of the markers in file 140(A) to the byte positions of the markers in file 140(B), and file 209(BA) does the same for the markers in file 140(B);

Two LN files 211. LN file 211(AB) relates lines in file 140(A) to the byte positions of the corresponding lines in file 140(B), and file 211(BA) does the same for the lines in file 140(A).

Details of FIT file 209(AB) and LN file 21 1(AB) are shown in FIG. 3. FIT file 209(AB) is made up of one marker entry 301 for each marker 203. Entry 301(0) corresponds to marker 203(0), entry 301 (1) to marker 203( 1 ), and so on through entry 301(n) and marker 203(n). Each entry 301(i) contains two integer values, byte position 205(A,i) for marker 301(i) in file 140(A) and byte position 205(B,i) for marker 301(i) in file 140(B). In FIT file 209(BA), entry 301(i) of course contains byte position 205(B,i) and byte position 205(A,i).

To find the approximate position of the translation of a term in file 140(A) in file 140(B), one proceeds as follows: given the byte position of the term in file 140(A), one locates marker entries 301(i) and 301(j) in FIT file 209(AB) whose byte positions 205(A,i) and 205(A,j) are the byte positions in the FIT file which most closely bracket the byte position of the term. Byte position 205(B,i) in entry 301 (i) then gives the position of marker 301(i) in file 140(B), and byte position 205(B,j) in entry 301(j) gives the position of marker 301(j). An interpolation between these brackets in file 140(B) which is based on the position of the term in file 140(A) is then used to locate the approximate position of the translation of the term in file 140(B).

LN file 211(AB) has one entry 303 for each of the lines in text file 140(A). An entry 303(i) has two parts: the text of the line in T 305(i), and the byte position of the corresponding line in file 140(B) in CEB 307(i). LN file 211(AB) and its counterpart 211(BA) are used in split displays of files 140(A) and 140(B): when the cursor moves to a line i in file 140(A), CLB 307(i) is used to locate the corresponding line in file 140(B) for display.

Once FIT files 209 for a pair of files 201 have been created, the information they contain may be used in many operations which are useful to the translator or translation manager. To begin with, given a FIT file 209 for a pair of files 201, it is easy to use windows or split screens like that employed in the Translator's Workbench to display parallel parts of the pair of files. When a given location in one of the pair of files appears in the window for that file, the FIT file 209 can be used to locate the corresponding location in the other of the pair of files, so that location can be displayed in that file's window.

Another operation is making bilingual concordances. Such a concordance lists all locations containing occurrences of a given term in a first one of the pair of files and all locations corresponding to the occurrences in the second one of the pair of files. The concordance thus shows all of the translations of the term which are used in the pair of files. FIG. 8 shows a bilingual concordance produced by a preferred embodiment. Bilingual concordance 801 is a concordance for "Christian Science" 805 and its German translation, "Chfistliche Wissenchaft" 803. A particular advantage of bilingual concordances produced using aligned texts is that by the very nature of the method itself, the concordances are full context. The amount of context can of course be adjusted as required for the purpose at hand.

Bilingual concordances are useful for both translators and translation managers. A translator may make a bilingual concordance for a term using a pair of files which had been previously translated and then study the concordance to determine how to translate the term in a new context. A translation manager may make a concordance of a finished translation job to check for consistency in translating a term or may make a concordance as part of making a glossary.

The bilingual concordance may simply be displayed on the screen of the workstation or PC, in which case, corresponding elements of the two lists may be displayed one beneath the other or side by side, or it may be processed further by a histogram program. The histogram program lists the words by the frequency with which they occur in the locations in the second file which correspond to the locations of the occurrences of the given term in the first file. The most frequent words in the locations have a high probability of being translations of the term, and the histogram program thus establishes a range of equivalents.

Figure 4:
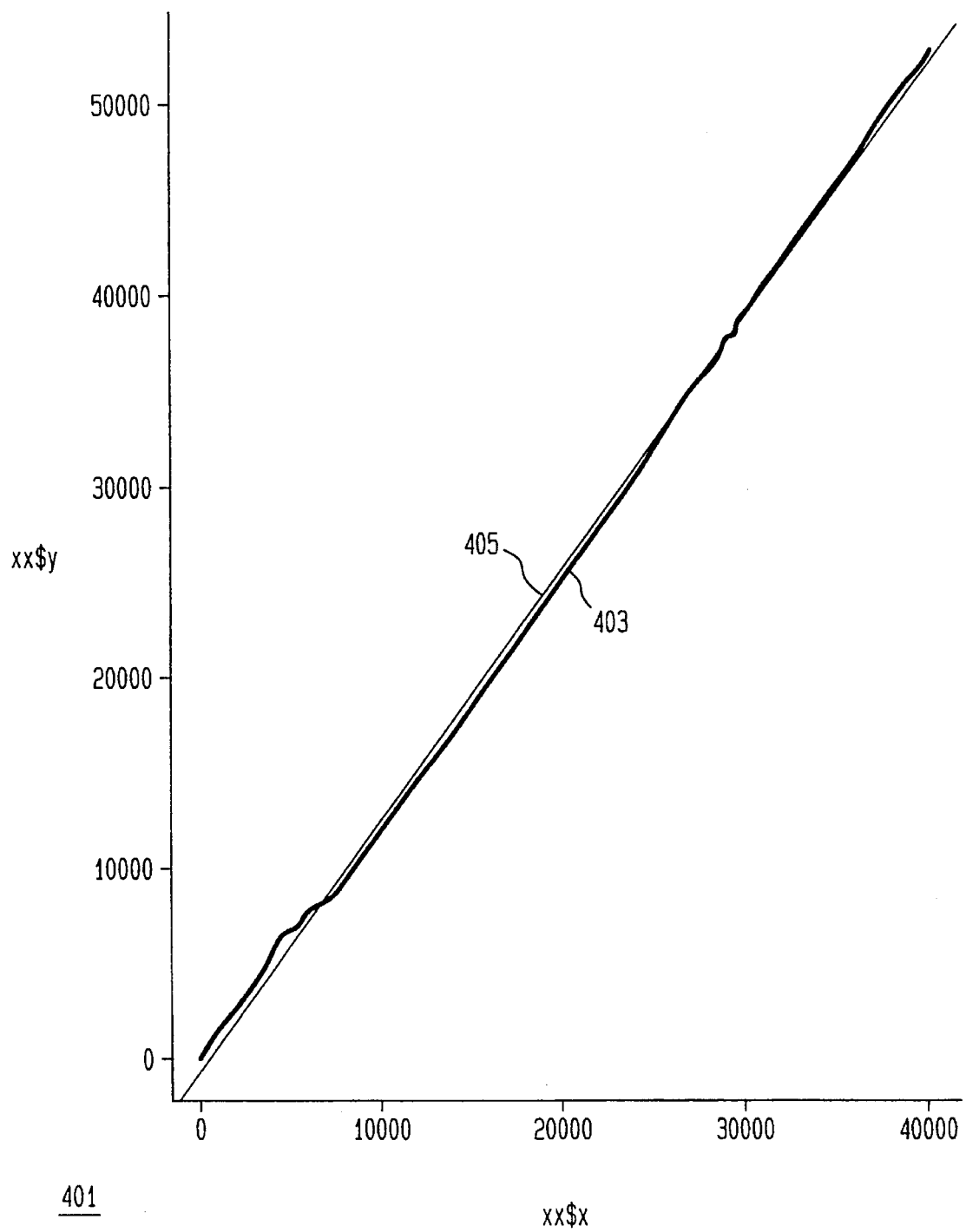
FIG. 4 is a graph of a curve produced from a FIT file and an approximation thereof.
Figure 5:
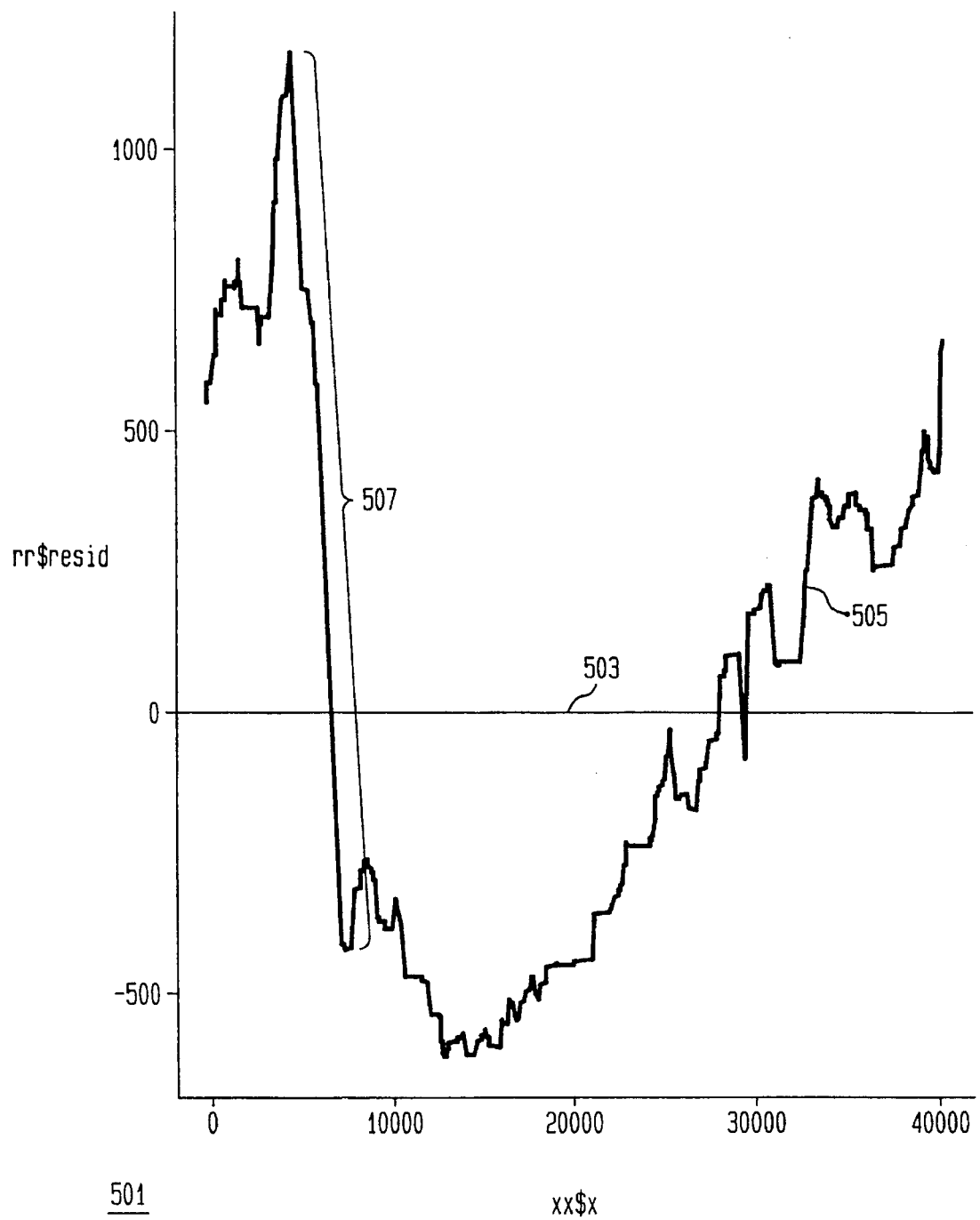
FIG. 5 is a graph showing how a FIT file can be used to detect errors in a translation.

When cognates are used as markers, FIT files 209 may be employed to automate the detection of parts of one of the pair of files which are not present in the other. The technique is shown in FIGS. 4 and 5. As shown in FIG. 4, an interactive graphing program is used to make graph 401 in which the x axis indicates the bytes in the first file of the pair and the y axis indicates the bytes in the second file of the pair. Each entry in FIT 209(AB) for the pair gives a byte position in the first file and a byte position in the second file, and thus specifies a point on the graph. The curve made by the points appears as dark line 403. Next, the interactive graphing program is used to find a function which produces a straight line 405 which is the closest possible approximation to curve 403. It will be observed in FIG. 4 that curve 403 generally is either on or nearly parallel to line 405, but there is an area of fairly rapid change relative to line 405 at the byte position of approximately 900 in the first file of the pair. The change indicates that the text of the second file has been displaced relative to the first file at approximately that point and the displacement indicates that there is material in the first file which has no correspondence in the second file or vice-versa. For example, if the first file is a revision to be translated and the second file is a translation made prior to the revision, the displacement may indicate the location of new material to translate. If the second file is a finished translation of the first file, the displacement may indicate material that was omitted from the translation.

The graph of FIG. 4 may be further processed to produce other graphs which make such displacements more visible.

FIG. 5 is such a graph. Graph 501 has an x axis which represents the number of bytes in the first file of the pair and a y axis which represents the amount by which curve 403 deviates from line 405. Line 503 represents no deviation. The result of plotting the deviation against the number of bytes is curve 505; there is a large change in the deviation at area 507 of that curve, and as might be expected, area 507 corresponds approximately to byte position 900, which appears to be the location of the displacement.

Once an area of interest has been detected using a graphical representation such as that of FIG. 5, FIT file 209 may be used to display the relevant parts of the two files. One way to do this interactively is to select a position on the x axis of the graph of FIG. 5. That position specifies a byte in the first of the pair of files, and the FIT file 209 can be used to display the relevant parts of the pair of files in a split screen or in two windows, as previously described.

Figure 6:
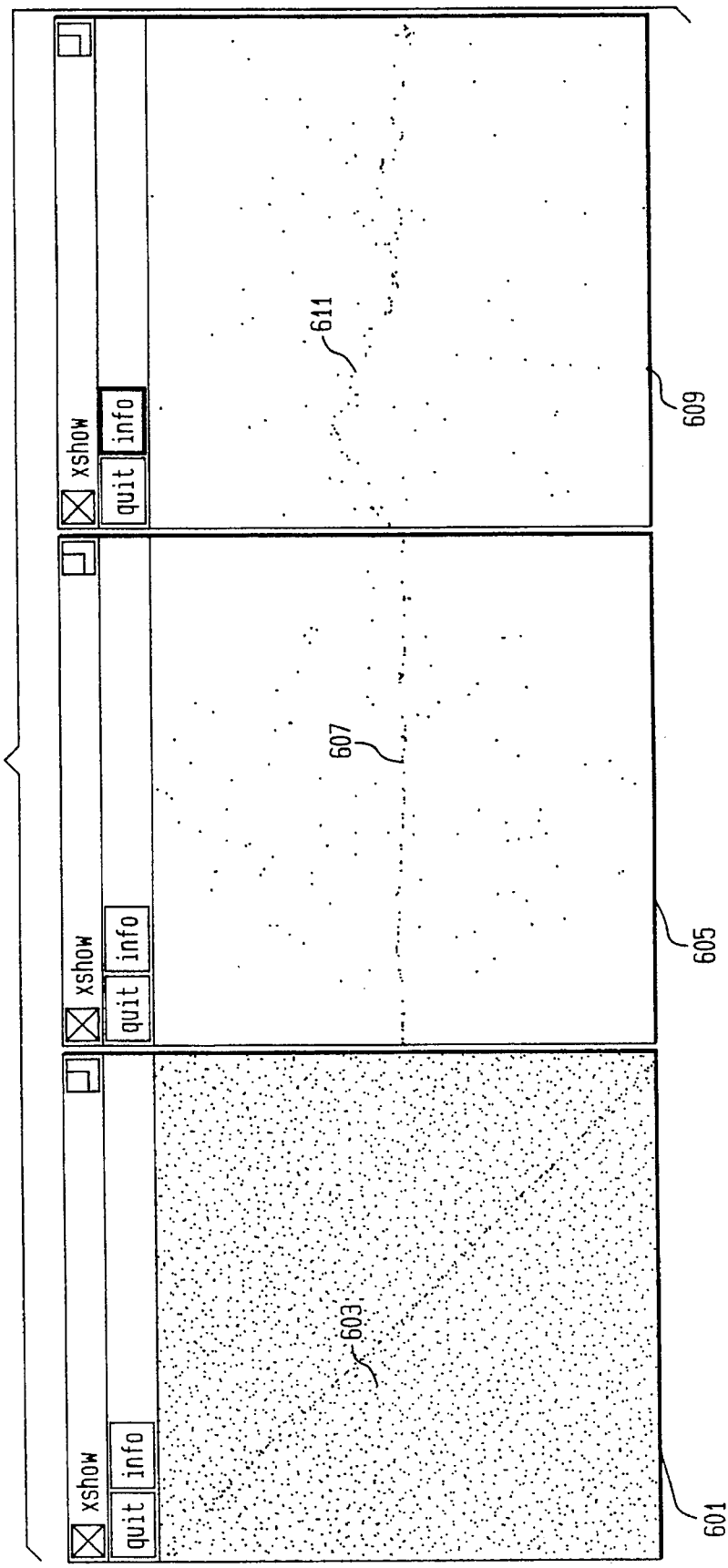
FIG. 6 is a set of scattergrams showing the use of cognates to find an alignment path.
Figure 7:
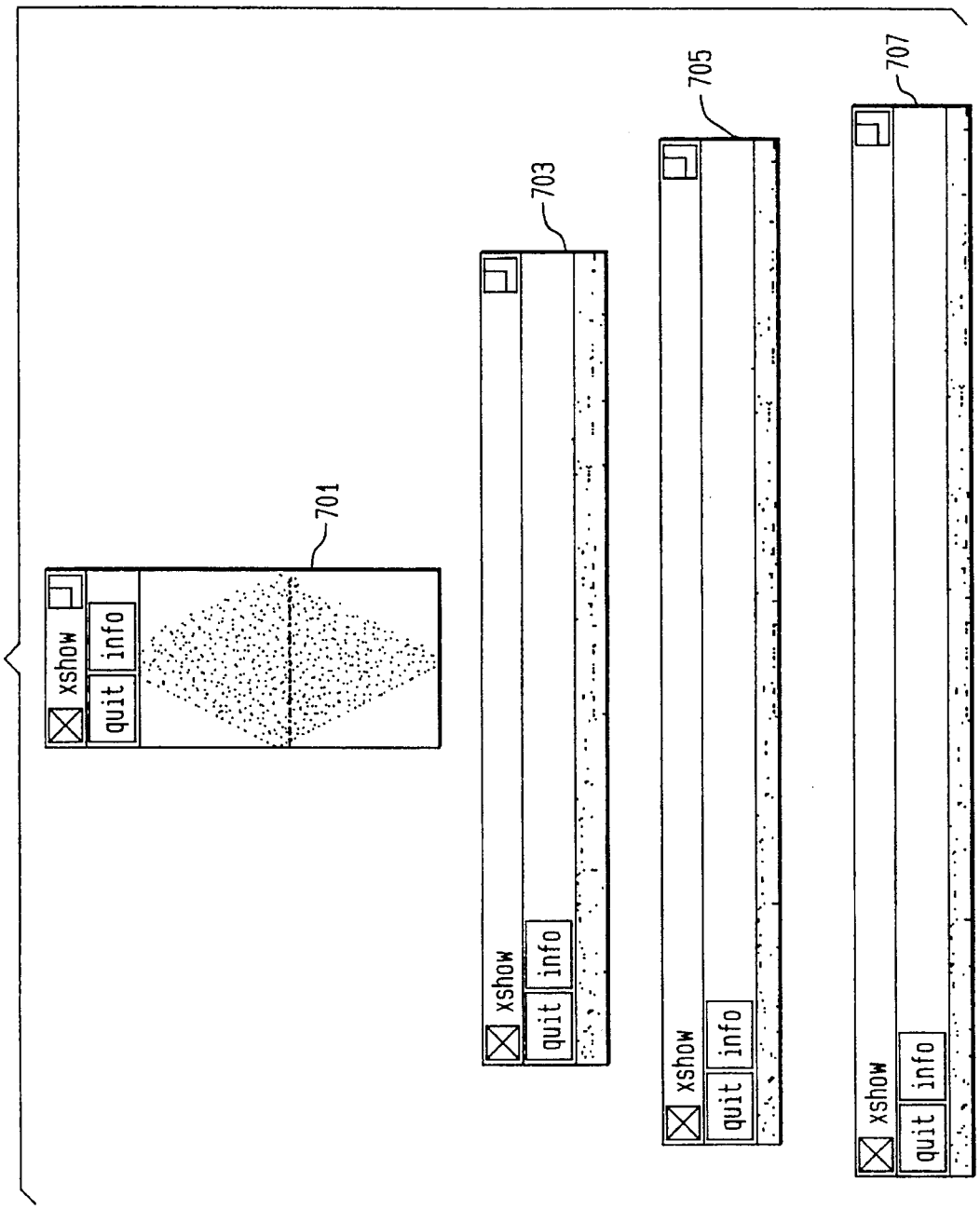
FIG. 7 is a set of scattergrams showing the results of the computation of an alignment path.

Making FIT File 209: FIGS. 6–7

As previously pointed out, anything which remains constant during the process of translation may be used as a marker for text alignment. Use of paragraphs and sentences as markers is described at W. Gale and K. Church, "A Program for Aligning Sentences in Bilingual Corpora", *Proceedings: 29th Annual Meeting of the Association for Computational Linguistics,* pp. 177–184, 1991. While alignment based on paragraphs and sentences as markers works well when the pair of files being aligned contain nothing other than a text and its translation, it encounters difficulties when the pair of files contains material such as the formatting codes used by text editors, footnotes, material such as page headers and footers, or artifacts introduced by an optical character reader. For this reason, the presently-preferred embodiment employs cognates as markers. As employed in the following, a cognate is any word which is changed not at all or only minimally by a translation. Cognates are more frequent than paragraphs or sentences, and are further more closely related to the content of what is being translated. Alignment using cognates consequently works even in the presence of formatting codes, footnotes, page headers and footers, and artifacts introduced by the optical character reader.

FIG. 6 shows conceptually how alignment using cognates works. Scatter plot 601 was made using a short English article: (11,332 bytes) and its German translation (13,294 bytes). Both were scanned into a Sun4 workstation using the Xerox ScanWorX OCR device. The two texts were plotted in graph 601 using positions in the English article as the x axis and those in the German article as the y axis. A dot was placed in position x, y whenever the 4-gram (the four letters) starting at position x were the same as the 4-gram starting at position y. (The origin is placed in the upper left corner for reasons that need not concern us here.) There is a very interesting diagonal line 603 running through scatter plot 601. This diagonal line is produced by the presence of cognates in the two texts. More can be learned about line 603 by rotating and enhancing scatter plot 601 to produce scatter plot 605 with line 607. It is apparent from plot 605 that line 607 is not straight; this feature of line 607 is made even clearer in scatter plot 609, in which line 611 is line 607 with a 10× gain on the vertical axis.

Since the x and y axes represent positions in the English text and its German translation, a FIT file 209 for the two texts can in principle be made from scatter plot 601 simply by making a marker entry 301 for each position on the x axis for which there is a point on line 603. The contents of entry 301 are the x and y coordinates of the point. Because line 603 shows how to align the pair of files, line 603 is termed in the following the alignment path. It should be pointed out here that once the alignment path is determined, an entry in a FIT file 209 may be made for any pair of bytes which are on the alignment path, whether or not the bytes actually contain markers.

While the relationship between a FIT file 209 and an alignment path is conceptually simple, a practical implementation of the principle illustrated in FIG. 6 must deal with a number of problems. The problems fall into two classes: distinguishing the points on the alignment path from the other points in scattergram 601 (i.e., filtering out the noise) and reducing the amount of memory space and computation time required to define the alignment path. The following discussion will first describe how the filtering is done and then show how the memory space and computation time can be reduced.

Distinguishing the Alignment Path: FIG. 7

Conceptually, the alignment path is distinguished by an iterative process of "focussing in" on the line. During this process, the necessary information about matching 4-grams is contained in a two-dimensional array called an F-image. Each cell of the array is associated with a byte position in the first file and a byte position in the second file. If the two files have matching 4-grams at those byte positions, the cell contains a positive value; otherwise, it is set to 0. During the following exposition, the positive value will be assumed to be 1; however as will be explained in more detail later, the positive value may be "weighted" to indicate the significance to be attributed to the match. At the beginning of the "focussing in" process, the cells are associated with combinations of byte positions which have a reasonable possibility of containing cognates (i.e., of being on the alignment path), and at the end, the cells are associated with combinations of byte positions which have a very high probability of containing cognates.

As is apparent from the foregoing discussion, there are many more combinations of byte positions which have a reasonable possibility of containing cognates than there are combinations which have a very high probability of containing cognates. Consequently, the F-image will represent many more combinations of byte positions at the beginning of the "focussing in" process than they will at the end. Technically speaking, the resolution of the F-image will increase. Further, the range of byte positions in the second file which will be of interest for a given byte position in the first file will be much smaller at the end of the process than at the beginning. Again technically, the bounds which define the combinations of positions which are of interest will be reduced. Since the size of the F-image remains the same, the resolution of the F-image is a function of its bounds.

In a preferred embodiment, the following method is used to compute the F-image:

1. Estimate the initial bounds;
2. Determine the initial resolution from the memory size and the bounds;
3. Determine the initial dimensions of the F-image from the initial bounds and the initial resolution;
4. Compute an initial F-image using the initial dimensions;
5. Compute the best alignment path in the initial F-image; and 6. Repeat until no further significant reduction in bounds is attained:
   a. Reduce the bounds so that they just contain the best alignment path;
   b. Determine a new resolution using the reduced bounds;
   c. Determine the new dimensions of the F-image using the reduced bounds and the new resolution;
   d. Compute a new F-image using the new dimensions; and
   e. Compute the best alignment path in the new F-image.

In the following, the implementation of the above steps in a presently-preferred embodiment is discussed in detail.

In computing the first F-image, the preferred embodiment computes it from a search space in the pair of files being aligned which is defined as follows: any byte in text x is compared with any byte in target text y which is between $f(x)-B_{min}$ and $f(x)+B_{max}$, where $f(x)$ is the best guess of the corresponding byte position in y. A fairly reasonable estimate of $f(x)$ can be obtained by linear interpolation, $$f(x) = x \frac{N_y}{N_x},$$

where $N_x$ is the length of x, $N_y$ is the length of y, in bytes. $B_{min}$ and $B_{max}$ are the bounds on the search space. Initially, the bounds, $B_{min}$ and $B_{max}$ are both set to $N_y$.

The calculation of the resolution, r depends on amount of memory, M which is available for the F-image. The resolution factor indicates the resolution of the F-image in units of bytes per cell in the array.

$$r = \sqrt{\frac{(N_x + N_y)(B_{max} + B_{min})}{M}}$$

The F-image is then allocated with a height of $$\frac{B_{max} + B_{min}}{r} \text{ and a width of } \frac{N_y}{r}.$$

Once the width and height of the F-image have been established, its cells can be set to the proper values. Each call represents a single combination of a byte position in the first file and a byte position in the second file. If the 4-grams which begin at those byte positions are the same, the cell is set to a positive value; otherwise, it is set to 0. The resolution is used to map byte positions onto cell indices.

After the F-image is computed, it is time to find the best path from position 0, start to position w,end. A dynamic programming algorithm is used to find the path with the largest average weight. That is, we keep a running sum of the weights along the path in the variable sum and the length of the path in the variable lengths. For details on dynamic programming, see Chapter 16 of Cormen, Leiserson, and Rivest, *Introduction to Algorithms*, the MIT Press, 1990, p. 301. Code in the C language for the algorithm used in a preferred embodiment to compute the best path is given below.

```
#define CELL(i,j,width) ((i) + (j) * (width))
#define DIST(d) (sqrt((d)*(d) + 1.0))
void
best_path(result, fimage, width, height, start, end)
    int *result, width, height, start, end;
    float *fimage;
{
    int i, j, jj, c, cc, best, low, high, d, l;
    int n = width * height;
    float *sums = (float *)alloc(sizeof(float) * n);
    float *lengths = (float *)alloc(sizeof(float) * n);
    int *prev = (int *)alloc(sizeof(int) * n);
    double score, best_score, sum;
low = start - 1;
high = start + 2;
if(low < 0) low = 0;
if(high > height) high = height;
for(j = low; j < high; J++) {
    d = j - start;
    c = CELL(0,j,width);
    lengths[c] = DIST(d);
    sums[c] = fimage[c] + 1;
    prev[c] = start;}
for(i = 1; i < width; i++) {
    for(j = 0; j < height; j++) {
        c = CELL(i - 1, j, width);
        low = j - slope_constraint;
        high = j + slope_constraint + 1;
        if(low < 0) low = 0;
        if(high > height) high = height;
        for(jj = low; jj < high; jj++) {
            cc = CELL(i,jj,width);
            sum = sums[c] + fimage[cc];
            l = lengths[c] + DIST(j - jj);
            score = sum/l;
            if(!lengths[cc] score > sums[cc]/lengths[cc]) {
                lengths[cc] = l;
                sums[cc] = sum;
                prev[cc]]= j; }}}
best = 0;
best_score = 0;
i = width - 1;
low = end - slope_constraint;
high = end + slope_constraint + 1;
if(low < 0) low = 0;
if(high > height) high = height;
for(j = low; j < high; j++) {
    c = CELL(i, j, width)
    sum = sums[c];
    l = lengths[c] + DIST(j - end);
    score = sum/l;
    if(score > best_score) {
        best = j;
        best_score = score;)}
j = best;
for(i = width - 1; i >= 0; i—) {
    result[i] = j;
    c = CELL(i, j, width);
    j = prev[c];}}
```

FIG. 7 is a set of scattergrams of four F-images made from a pair of texts using the algorithm just described. Scattergram 701 shows the first iteration, 703 the second, 705 the third, and 707 the fourth. Table 1 below shows the calculation of the bounds, the resolution factor, and the width and height of the F-image, respectively, used in the four iterations. In this example, $N_x$ and $N_y$ were 11,332 and 13,290, respectively. M was set to a relatively small number, 25,000 bytes, for expository convenience, so that the scattergram for the f-image would fit on a conventional display with approximately 1000×1000 pixels. Of course, for practical purposes, it is desirable to make the F-image as large as possible so that the resolution is optimal. Thus, in more typical applications, M is usually set to at least a megabyte.

TABLE 1

Parameters estimates for Example in FIG. 6

| Iteration | Bmin | Bmax | Resolution (r) | Width (w) | Height (h) |
|---|---|---|---|---|---|
| 0 | 13,290 | 13,290 | 109.7 | 121 | 206 |
| 1 | 329 | 219 | 17.1 | 778 | 32 |

TABLE 1-continued

Parameters estimates for Example in FIG. 6

| Iteration | Bmin | Bmax | Resolution (r) | Width (w) | Height (h) |
|---|---|---|---|---|---|
| 2 | 273 | 85 | 13.8 | 963 | 25 |
| 3 | 248 | 68 | 13.0 | 1025 | 24 |

In the foregoing example, the value assigned to a cell of the F-image when there is a matching 4-gram has been presumed to be one. The difficulty with this procedure is that some matches of 4-grams are less interesting than others. For example, if the languages of the pair of texts are English and French, a match on the 4-gram tion has very little significance for locating cognates. The value of the F-image for calculating the alignment path can thus be improved by taking how interesting a 4-gram is into account. Such a procedure is called term weighting or indexing. A recent reference on the subject is Salton, G., *Automatic Text Processing*, Addison-Wesley Publishing Co., 1989. There are many possible functions for determining the weight of a 4-gram; the function used in a preferred embodiment is based on the frequencies fx and fy of the 4-gram in the first and second files; the weight to be given to the 4-gram is then $$\frac{1}{(fx * fy * (fx + fy))}$$

Reducing Memory Space and Computation Time

The amount of memory space required for the F-image can be reduced by the use of compression techniques and the amount of computation time can be reduced by approximation. Techniques employed for doing compression and approximation are discussed below.

Compression

In the following discussion, the F-image is presumed to have N * N cells. ff N is large, it becomes impractical to allocate $N^2$ storage, and therefore it becomes necessary to compress the image in some way. Suppose that we wanted to compress the F-image from N by N, down to n by n for some n <<N. Then we could simply aggregate values that fall into the same n by n cell as shown below. Of course, it is recommended that the signal be filtered appropriately before compression in order to avoid aliasing. Filtering may also be useful if there are too many (or too few) dots in the F-image. In general, various well-known signal processing techniques might be useful for enhancing features of interest.

```
/* Initialize f-image */
float fimage[n][n] = {0};
/* Map x from token coordinates
   into f-image coordinates */
#define CELL(x) (((x) * n) / N)
for(i=0; i<N; i++)
    for(j=0; j<N; j++)
        if(tokens[i] == tokens[j])
            fimage[CELL(i)][CELL(j)] +=
                weight([tokens[i]]);
```

Approximation

In practice, if N is very large, it becomes impractical to perform the $N^2$ comparisons and it is therefore useful to introduce an approximation. In particular, we assume that extremely frequent tokens will have vanishingly small weights, which can be approximated as zero. Consequently, it becomes unnecessary to compute their contributions to the F-image, producing a significant savings in time.

Before presenting the approximation, it is convenient to introduce the concept of a posting, a precomputed data structure that indicates where a particular type can be found in the input sequence. Thus, for the input sequence, "to be or not to be," there are two postings for the type "to": one at position 0 and the other at position 4. One can compute the dots for the type "to" in this example by placing a dot in positions: (0, 0), (0, 4), (4, 0), and (4, 4). In general, for a word with frequency f, there are $f^2$ combinations of postings that need to be considered. The algorithm below simply iterates through all $f^2$ combinations for each of the V types in the vocabulary.

```
for(type=0; type<V; type++) {
    w = weight (type);
    f = freq[type];
    postings = get_postings(type);
    for(p1=0; p1 < f; p1++) {
        i = postings[p1];
        for(p2=0; p2 < f; p2++) {
            j = postings[p2];
            fimage[CELL(i)][CELL(j)] += w;}}}
```

We now come to the key approximation. If we assume that types with large frequencies (f>T, for some threshold T) have negligible weights, then we don't need to iterate over their postings. This approximation produces significant savings since it allows us to ignore just those types with large numbers of postings. In fact, the resulting computation takes less than V $T^2$ iterations. In practice, we have found that T can often be set quite small; by default T is set to 100.

```
for(type=0; type<V; type++) {
    w = weight(type);
    f = freq[type];
    /* the key approximation */
    if(f < T) {
        postings = get_postings(type);
        for(p1=0; p1 < f; p1++) {
            i = postings[p1];
            for(p2=0; p2 < f; p2++) {
                j = postings[p2];
                fimage[CELL(i)][CELL(j)] += w;}}}}
```

Conclusion

The foregoing "Detailed Description" has disclosed to one of ordinary skill in the art how a translator's assistant may be made and used which greatly simplifies the tasks of finding the right terms to be used in a translation and of detecting errors in the translation. Simplification of the tasks has been made possible by the use of aligned texts, and the "Detailed Description" has also disclosed a technique which employs cognates to align texts and techniques for aligning very large texts.

As indicated in the "Detailed Description", and as will be immediately apparent to those of ordinary skill in the art, many variations on the disclosed techniques are possible. For example, in some embodiments, a translator may be able to align texts and use the aligned texts to make concordances and glossaries and to check for correctness and completeness. Further, the techniques described may be used with many different transistor's toolkits and different kinds of user interfaces. Moreover, the techniques used m find an alignment path based on cognates may be used for other markers based on correspondences between n-grams in the text. For example, if the text and its translation use the same mark-up language, the alignment could be based on sequences of the mark-up language. Finally, many different algorithms may be used to perform the computations disclosed herein. The above being the case, the foregoing Detailed Description is to be regarded as being in all respects illustrative and exemplary, and not restrictive, and the scope of the inventions disclosed herein is m be determined solely by the following claims as interpreted in light of the Specification and according to the Doctrine of Equivalents.

What is claimed is:

1. Translation analysis apparatus, the apparatus operating on first and second integral unaligned texts where the second text is at least in part a translation of at least a portion of a first text, the apparatus comprising:

means for storing a set of pairs of locations, each pair of locations including a first location in the first integral unaligned text and a second location in the second integral unaligned text that is in the neighborhood of the translation of the first location, the set of pairs of location being markers;

means for responding to a specification of a given location in the first text by employing positioning from the set of pairs of locations to determine a specification of a corresponding location in the second text that is in the neighborhood of the translation of the given location in the first location, by using the positioning from the set of pairs of locations; and concordance making means for finding a first set of locations of a term in the first text, making a second set of the corresponding locations in the neighborhood of a corresponding term translation in the second text by providing the locations in the first set thereof to the responding means, and making the concordance using the term location in the first set and the corresponding term location in the second set.

2. The apparatus set forth in claim 1 wherein:

the concordance making means makes the concordance by using for each term location in the first set a fist portion of the first text which is in the neighborhood of the fist location and for each corresponding location in the second set a second portion of the second text which is in the neighborhood of the second location, whereby the concordance is a full context concordance.

3. The apparatus set forth in claim 2 wherein:

the concordance making means gives the first portion and/or the second portion varying sizes.

4. The apparatus set forth in claim 1 further comprising:

glossary making means which makes a glossary based on the concordance.

5. Translation analysis apparatus, the apparatus operating on first and second texts where the second text is at least in part a translation of at least a portion of a first text, the apparatus comprising:

means for storing a set of pairs of locations, each pair of locations including a first location in the first text and a second location in the second text that is in the neighborhood of the translation of the first location;

means for producing the set of pairs of locations by making a graph of the occurrences of markers in the first text and the second text, determining an alignment path in the graph, and producing the set of pairs of locations from the alignment path;

means for responding to a specification of a given location in the first text by employing the set of pairs of locations to determine a specification of a corresponding location in the second text which is in the neighborhood of the translation of the first location; and histogram making means for finding a first set of locations of a term in the first text, making a second set of the corresponding locations by providing the locations in the first set thereof to the means for responding to a specification of a given location, and making the histogram using the locations in the second set, the histogram showing frequencies of occurrences of words in the second set of locations.

6. Translation analysis apparatus, the apparatus operating on first and second texts where the second text is at least in part a translation of at least a portion of a first text, the apparatus comprising:

means for storing a set of pairs of locations, each pair of locations including a first location in the first text and a second location in the second text which is in the neighborhood of the translation of the first location;

means for responding to a specification of a given location in the first text by employing the set of pairs of locations to determine a specification of a corresponding location in the second text which is in the neighborhood of the translation of the first location; and means for detecting differences between the first text and the second text by making a graph from the set of pairs of locations which shows a relationship between the pairs of locations in the set and other parts of the texts and analyzing the graph by comparing a curve made from the set of pairs of locations with a predetermined approximation thereof.

7. The apparatus set forth in claim 6 wherein:

the means for detecting differences analyzes the graph by comparing the curve made from the set of pairs of locations with a linear approximation thereof.

8. The apparatus set forth in any of claims 1, or 6 further comprising:

means for producing the set of pairs of locations by making a graph of the occurrences of markers in the first text and the second text which are minimally affected by the translation process, determining an alignment path in the graph, and producing the set of pairs of locations from the alignment path.

9. The apparatus set forth in claim 8 wherein:

the markers are cognates.

10. Translation analysis apparatus, the apparatus operating on first and second texts where the second text is at least in part a translation of at least a portion of a first text, the apparatus comprising:

means for making a set of pairs of locations by comparing letters in the first text with letters in the second text, each pair of locations including a first location in the first text and a second location in the second text which is in the neighborhood of the translation of the first location;

means for producing the set of pairs of locations by making a graph of the occurrences of cognates in the first text and the second text, determining an alignment path in the graph, and using the alignment path to produce the set of pairs of locations;

means for storing the set of pairs of locations; and means for responding to a specification of a given location in the first text by employing the set of pairs of locations to determine a specification of a corresponding location in the second text which is in the neighborhood of the translation of the first location.

11. The apparatus set forth in claim 10 further comprising;

display means responsive to the specification of the given location and the specification of the corresponding location for displaying a first portion of the first text which is in the neighborhood of the given location and a second portion of the second text which is in the neighborhood of the corresponding location.

12. The apparatus set forth in claim 11 wherein:

the display means includes means for simultaneously displaying the first portion and the second portion.

13. The apparatus set forth in claim 12 wherein:

the means for simultaneously displaying the first portion and the second portion displays the first portion above the second portion.

14. The apparatus set forth in claim 12 wherein:

the means for simultaneously displaying the first portion and the second portion displays the first portion next to the second portion.

15. The apparatus Set forth in claim 10 wherein:

the distance between adjacent locations in the first text which belong to the pairs thereof is much less than the average length of a sentence in the first text.

16. A method employed with a first text and a second text, the second text being at least in part a translation of at least a portion of the first text, to make a set of pairs of locations stored in a computer system, each pair of locations including a first location in the first text and a second location in the second text which is in the neighborhood of the translation of the first location, the method comprising the steps performed in the computer system of:

using a representation of occurrences of cognates in the first text and the second text stored in the computer system and processing means in the computer system to determine an alignment path; and using the processing means to derive the pairs of locations from the alignment path.

17. A method employed with a first text and a second text for determining an alignment path for the first text and the second text, the method comprising the steps performed in a computer system of:

employing processing means in the computer system to make an F-image and store the F-image in the computer system, the F-image having a plurality of cells, each cell representing a first portion of the first text and a second portion of the second text and each cell being given a first value if the first portion and the second portion do not contain the same n-gram and a second value if they do; and employing the processing means to compute the alignment path from the F-image.

18. The method set forth in claim 17 wherein:

the step of making an F-image makes an initial F-image having initial bounds and an initial resolution;

the step of computing the alignment path computes an initial alignment path; and the method further includes the step of repeating steps until no further reduction in bounds can be achieved, the steps being repeated including making a new F-image with bounds and resolution which just include the most-recently computed alignment path; and computing the alignment path in the new F-image.

19. The method set forth in either of claims 17 or 18 wherein:

the step of computing the alignment path is performed by employing a dynamic programming algorithm to locate the alignment path in the F-image.

20. The method set forth in either of claims 17 or 18 wherein:

the step of making the F-image includes the step of weighting the second value to reflect the significance of the n-gram for determining the alignment path.

21. The method set forth in claim 20 wherein:

the step of weighting includes the step of assigning the first value to the cell if the n-gram has a frequency which is above a predetermined threshold.

22. The method sete forth in either of claims 17 or 18 wherein:

the step of making the F-image includes the step of compressing the f-image to increase the size of the portions of the first text and the second text represented by the cells.

* * * * *